July 30, 1963
C. E. SMITH, JR
3,099,782
AUTOMATIC BATTERY CHARGING CONTROL WITH
UPPER AND LOWER VOLTAGE LIMITS
Filed Dec. 15, 1959
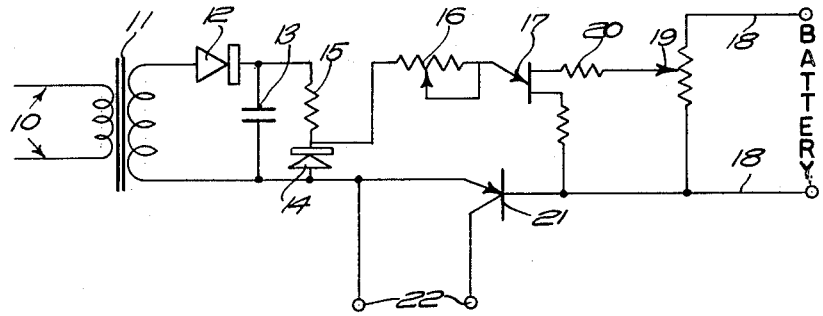
FIG. 1
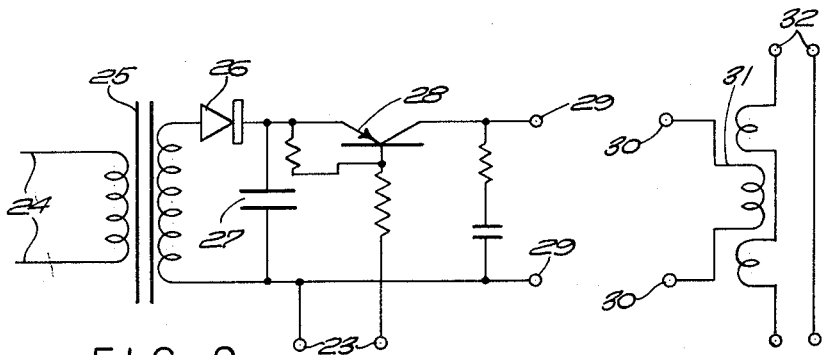
FIG. 2
FIG. 3
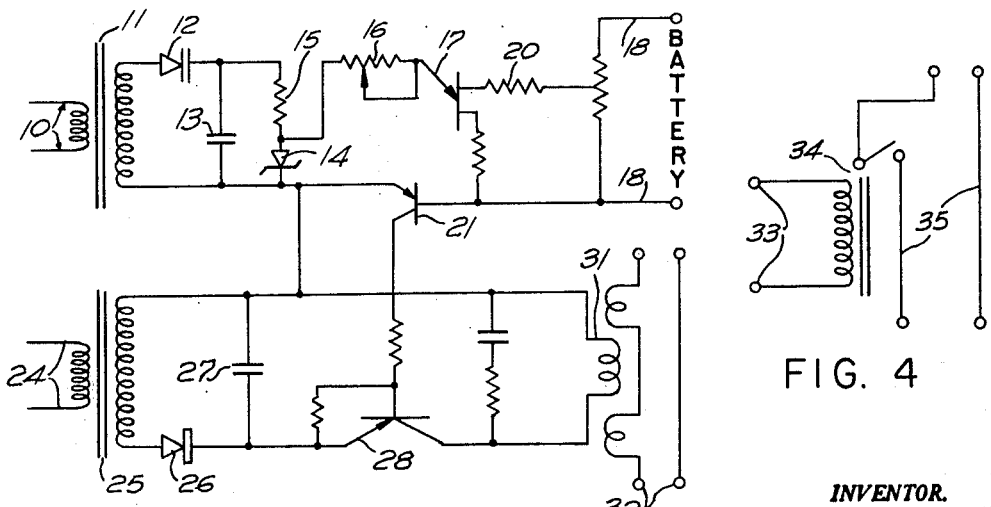
FIG. 5
FIG. 4
INVENTOR.
CHARLES E. SMITH, JR.
BY
Max Schwartz
ATTORNEY

United States Patent Office 3,099,782
Patented July 30, 1963

3,099,782
AUTOMATIC BATTERY CHARGING CONTROL
WITH UPPER AND LOWER VOLTAGE LIMITS
Charles E. Smith, Jr., North Providence, R.I., assignor to
La Marche Mfg. Co., Schiller Park, Ill., a corporation
of Illinois
Filed Dec. 15, 1959, Ser. No. 859,671
6 Claims. (Cl. 320—39)

My present invention relates to an automatic control system for a battery charger.

The principal object of the present invention is to provide an automatic control system for a battery charging device having upper and lower voltage limits.

Another object of the present invention is to provide a transistorized control system for a battery charger.

A further object of the present invention is to provide an automatic control system using a unijunction transistor for controlling the charging cycle on a battery.

Another object of the present invention is to provide an automatic transistor control which is simple in construction and easy and economical to manufacture and assemble.

With the above and other objects and advantageous features in view my invention consists of a novel arrangement of parts more fully disclosed in the detailed description following in conjunction with the accompanying drawings and more particularly defined in the appended claims.

In the drawings,

FIG. 1 is a diagram of the sensing unit of the present invention.

FIG. 2 is a diagram of the control unit of the present invention.

FIG. 3 is a diagram of the battery charger circuit control.

FIG. 4 is a diagram showing an alternative method of controlling the battery charging circuit.

FIG. 5 is a diagram of the complete circuit embodying the units shown in FIGS. 1, 2 and 3.

In many installations a D.C. battery provides the main source of power. This is true in certain lift trucks, golf carts and similar equipment. The usual practice is to recharge the battery during the night to replace the power and voltage consumed during the day. Most chargers operate on a time controlled basis so that they can be left unattended. The present invention provides a transistorized circuit for controlling the charging equipment on a voltage basis within fixed limits. It is contemplated that the charger will operate at or below a set minimum voltage and will cut off at a set maximum voltage. The device is completely automatic and permits the battery and charger to be plugged in and left unattended without undercharging or overcharging the battery.

The transistorized control comprises three separate circuits connected together each with its own function. The circuit shown in FIG. 1 is a sensing circuit which responds to the battery voltage to determine the need for starting or stopping the charging mechanism. The circuit shown in FIG. 2 is the operating control unit which takes the signal from the sensing circuit and transforms it into an operating signal which is sent to the final control unit shown in alternate forms in FIGS. 3 and 4. FIG. 5 illustrates the entire circuit, combining the circuits shown in FIGS. 1, 2 and 3. For purposes of illustration the examples given herein refer to the most common type of battery which is twelve volts with the charge in the battery maintained between twelve and fourteen volts. However, it is to be understood that the circuit can readily be applied to any battery voltage.

Referring more in detail to the drawings, the sensing circuit shown in FIG. 1 comprises a source of A.C. voltage 10 which is a standard 115 v. A.C. voltage. This is stepped down by transformer 11 to twelve volts. This voltage is then rectified at 12 filtered at 13 and applied across a zener diode 14 through the current limiting resistor 15. Because of the characteristics of the zener diode 14 the resultant voltage is constant within .1 volt for a variation in the A.C. line input 10 of from 100 v. to 130 v.

The zener output voltage is a reference voltage. This reference voltage is applied through a variable resistor 16 to the emitter and base of the unijunction transistor 17. The battery voltage line 18, which samples the battery voltage is passed through the voltage divider 19 and current limiting resistor 20 to the bases of the unijunction transistor 17.

The device operates as follows: If the battery voltage across the bases of the unijunction transistor is greater than the reference voltage across the emitter then the unijunction transistor will not conduct. This is one of the characteristics of a unijunction transistor. As the battery discharges and the voltage drops, a point is reached at which the transistor 17 will conduct rapidly. This current flow will pass through the transistor 21 which is a straight D.C. amplifier capable of operating a relay, lamp or power transistor.

When the unijunction transistor is conducting the reference voltage due to low battery voltage conducts through variable resistor 16 which develops a voltage drop. This in turn determines how high the battery voltage must rise before the unijunction transistor will cease to conduct. It will be found that the battery voltage must rise above the reference voltage to stop the firing of the unijunction transistor 17. The battery voltage must fall below the reference voltage or the voltage necessary to hold the reference voltage in order to start the transistor 17. For example, if the reference voltage is approximately 10 volts the unijunction transistor 17 may start at below 10 or even at 10.5 or 11 volts. However, the transistor 17 may not stop until the battery voltage reaches 14 volts. Consequently the adjustment of the variable resistor 16 will determine the upper limit where you wish the transistor 17 to stop. The lower this resistance the greater the range between "on" and "off" of the unijunction transistor 17. The voltage dividing resistor 19 is adjustable for the lower limit or the point where you wish the transistor to start. For battery voltages higher than 12 volts, a resistor in series with the high side of the divider 19 will further divide the battery voltage while still retaining the non-critical adjustment. With the reference voltage set at approximately 12 volts the divider 19 should be set to approximately 12 volts regardless of the battery voltage.

The sensing voltage conducted through the transistor 21 is connected through leads 22 to the control circuit leads 23 shown in FIG. 2. This control circuit is also connected to a source of 115 v. A.C. current at 24 which passes through a transformer 25 which reduces it to 12 v. This current is also rectified and filtered at 26 and 27 and passed through the emitter of the transistor 28. In operation, when the transistor 21 of the sensing circuit is conducting, a negative voltage is applied through the leads 23 to the base of the power transistor 28. This results in a flow of the current from the supply 24 through the transistor 28 to the leads 29 which are connected to the battery charging circuit control devices shown in FIGS. 3 and 4.

In using the device shown in FIG. 3 the leads 29 are connected to leads 30 which in turn are connected to a saturable D.C. winding 31 which controls the current passing through the lines 32 from the A.C. input line to the charger. The charger is now "on". When the transistor 21 stops conducting, the current through the reactor to D.C. winding 31 is equal to the leakage of the transistor 28 and insufficient to cause a charging action. This turns the charger "off". In using the control device shown in FIG. 4 the leads 29 of the control circuit shown in FIG. 2 are connected to leads 33 which in turn are connected to a relay operated switch 34 which controls the battery charger A.C. input lines 35.

The device thus comprises a sensing circuit which produces a reference voltage against which the battery voltage is referred for starting and stopping the charger. When the need for charging is indicated the reference voltage is transmitted to the control circuit and used to fire a power transistor which controls the control voltage used to turn the charger circuit "on" or "off". The control circuits or switches shown in FIGS. 3 and 4 are of course merely illustrative. Any other type of line control switch operable by the control circuit can be used.

I have thus provided a comparatively simple transistorized circuit for automatically charging a battery within predetermined limits. It permits the charger to be left unattended without fear of overcharging or undercharging. Other advantages of the present invention will be readily apparent to a person skilled in the art.

I claim:

1. A battery charging control comprising a sensing circuit, a control circuit responsive to said sensing circuit, and a switching circuit responsive to said control crcuit for controlling the power source to the battery charger, said sensing circuit having a predetermined constant reference voltage, a battery voltage opposed to said reference voltage, and means starting flow of current to said control circuit at a predetermined minimum voltage of said battery and for stopping flow of current at a predetermined maximum voltage of said battery, said reference voltage being maintained at a constant level by a zener diode, and said means comprising a unijunction transistor.

2. A battery charging control comprising a sensing circuit, a control circuit responsive to said sensing circuit, and a switching circuit responsive to said control circuit for controlling the power source to the battery charger, said sensing circuit having a predetermined constant reference voltage, a battery voltage opposed to said reference voltage, and means starting flow of current to said control circuit at a predetermined adjustable minimum voltage of said battery and for stopping flow of current at a predetermined adjustable maximum voltage of said battery, said reference voltage being maintained at a constant level by a zener diode, and said means comprising a unijunction transistor.

3. A battery charging control comprising a sensing circuit, a control circuit responsive to said sensing circuit, and a switching circuit responsive to said control circuit for controllng the power source to the battery charger, said sensing circuit having a predetermined constant reference voltage, a battery voltage opposed to said reference voltage, and means starting flow of current to said control circuit at a predetermined minimum voltage of said battery and for stopping flow of current at a predetermined maximum voltage of said battery, said reference voltage being maintained at a constant level by a zener diode, and said means comprising a unijunction transistor, said control circuit including a source of alternating current and a transistor for regulating the flow of alternating current from said control circuit to said switching circuit, said transistor being responsive to a reference voltage delivered by said sensing circuit.

4. A battery charging control comprising a sensing circuit, a control circuit responsive to said sensing circuit, and a switching circuit responsive to said control circuit for controlling the power source to the battery charger, said sensing circuit having a predetermined constant reference voltage, a battery voltage opposed to said reference voltage, and means starting flow of current to said control circuit at a predetermined adjustable minimum voltage of said battery and for stopping flow of current at a predetermined adjustable maximum voltage of said battery, said reference voltage being maintained at a constant level by a zener diode, and said means comprising a unijunction transistor, said control circuit including a source of alternating current, and a transistor for regulating the flow of alternating current from said control circuit to said switching circuit, said transistor being responsive to a reference voltage delivered by said sensing circuit.

5. A battery charging control comprising a sensing circuit, a control circuit responsive to said sensing circuit, and a switching circuit responsive to said control circuit for controlling the power source to the battery charger, said switching circuit including a saturable winding, said sensing circuit having a predetermined constant reference voltage, a battery voltage opposed to said reference voltage, and means starting flow of current to said control circuit at a predetermined minimum voltage of said battery and for stopping flow of current at a predetermined maximum voltage of said battery, said reference voltage being maintained at a constant level by a zener diode, and said means comprising a unijunction transistor.

6. A battery charging control comprising a sensing circuit, a control circuit responsive to said sensing circuit, and a switching circuit responsive to said control circuit for controilng the power source to the battery charger, said switching circuit including a relay operated switch, said sensing circuit having a predetermined constant reference voltage, a battery voltage opposed to said reference voltage, and means starting flow of current to said control circuit at a predetermined minimum voltage of said battery and for stopping flow of current at a predetermined maximum voltage of said battery, said reference voltage being maintained at a constant level by a zener diode, and said means comprising a unijunction transistor.

References Cited in the file of this patent

UNITED STATES PATENTS

| | | |
|---|---|---|
| 2,885,623 | Staufenberg | May 5, 1959 |
| 2,897,432 | Jackson | July 28, 1959 |
| 2,903,639 | Mesaros | Sept. 8, 1959 |
| 2,903,640 | Bixby | Sept. 8, 1959 |
| 2,917,700 | Chase | Dec. 15, 1959 |
| 3,009,091 | Hallidy | Nov. 14, 1961 |